United States Patent [19]

Bickerstaff et al.

[11] 4,299,018
[45] Nov. 10, 1981

[54] ROLL FOR USE UNDER HIGH OR LOW TEMPERATURE CONDITIONS

[75] Inventors: Kenneth Bickerstaff, Widnes; John D. Brewin, St. Helens, both of England

[73] Assignee: Pilkington Brothers Limited, St. Helens, England

[21] Appl. No.: 28,440

[22] Filed: Apr. 9, 1979

[30] Foreign Application Priority Data

Apr. 14, 1978 [GB] United Kingdom ............... 14852/78

[51] Int. Cl.³ .................... B21B 31/08; B60B 7/06
[52] U.S. Cl. ........................................ 29/129; 403/30; 403/179; 403/404; 29/132; 65/253; 474/187; 474/190
[58] Field of Search ...................... 29/129, 129.5, 130, 29/132, 125; 403/30; 74/230.7; 65/245, 253

[56] References Cited

U.S. PATENT DOCUMENTS

| 253,183 | 2/1882 | Chapman | 29/125 UX |
|---|---|---|---|
| 1,889,523 | 11/1932 | Barber | 29/129 |
| 1,889,525 | 11/1932 | Barber | 29/129 |
| 1,889,527 | 11/1932 | Barber | 29/129 |
| 1,889,528 | 11/1932 | Barber | 29/129 |
| 2,788,957 | 4/1957 | Lindquist | 29/130 UX |
| 3,454,313 | 7/1969 | Lohneis | 403/30 X |
| 3,709,673 | 1/1973 | Bishop | 29/129 X |

Primary Examiner—Wayne L. Shedd
Attorney, Agent, or Firm—Burns, Doane, Swecker & Mathis

[57] ABSTRACT

A roll for use under high or low temperature conditions, for example a conveyor roll in a flat glass annealing lehr, comprises a tire of a different material from collars on the roll between which the tire is held. The tire and at least one collar have matching frusto-conical surfaces which are designed so that differential thermal expansion between the tire and the retaining collars causes sliding movement only of frusto-conical surfaces relative to each other.

3 Claims, 18 Drawing Figures

ROLL FOR USE UNDER HIGH OR LOW TEMPERATURE CONDITIONS

BACKGROUND OF THE INVENTION

1. Field of the Invention

This invention relates to a roll for use under high or low temperature conditions; for example conveyor rolls such as those used in a flat glass annealing lehr. The roll has at least one tire member with a frusto-conical surface which engages against a matching frusto-conical surface of a retaining member, and the tire member is of a different material from the retaining member.

Such rolls usually have annular tires which project from a central shaft. Under some temperature conditions, for example when transporting flat glass after it has been annealed, a range of materials are available for the tires, and a resilient material, for example rubber, can be selected which, because of its resilience, accommodates differential thermal expansion between the shaft of the roll and the tires mounted on the shaft. When designing rolls for operation under high temperature conditions, for example up to temperatures of the order of 650° C. a rigid tire material is usually necessary and this gives rise to problems due to differential expansion as between the shaft of the roll and the tires when any change in temperature takes place for example during warming-up of the lehr or when a hot roll in a lehr has to be changed.

2. Description of the Prior Art

A roll for hot or cold rolling is known from United Kingdom Pat. No. 1,374,130, in which a ring of hard metal alloy mainly consisting of hard carbides, is inset into the wall of a steel roll. The ring has frusto-conical faces and the roll body is cast into the ring, and the ring is compressively stressed as the cast roll body cools.

If the material of the shaft, in a roll of known construction, has a greater coefficient of thermal expansion than the material of the tire, the shaft will expand more than the tire as the temperature of the roll increases and the tire may be subjected to undesirable stress which may be sufficient to rupture the tire. If the coefficient of thermal expansion of the material of the shaft is less than the coefficient of thermal expansion of the material of the tire, the tire will expand more than the shaft and will tend to become detached from the shaft.

This problem has been alleviated to a degree, in the past, by designing the roll so that the parts of the roll have dimensions at the particular temperature of use such that any stress to which the tire is subjected has an acceptable value. This however can impose the need fo effecting adjustment after the roll has been assembled in the workshop at room temperature and during its heating up to the temperature of use. Further this usually limits the temperature of use to the particular temperature for which the roll is designed or, at best, a narrow temperature range around that particular temperature. It is a main object of the present invention to solve the problem of how to design a roll having one or more projecting tires spaced apart along the roll, which roll is suitable for use under hot or cold conditions.

SUMMARY

In a roll according to the invention the angle of the cone on which said matching frusto-conical surfaces lie is such that differential thermal expansion between the tire member and the retaining member causes sliding movement only of the frusto-conical surfaces relative to each other. This ensures that relative thermal expansion of the composite parts of the roll is accommodated in such a way that the pressure between engaging surfaces of the parts of the roll is not substantially affected by differential expansion of those parts, and undesirable strain of the parts of the roll is avoided.

The tire member may be an annular tire which is held between retaining collars at least one of which is secured to the roll shaft, the matching frusto-conical surfaces being at least one side face of the tire and a matching retaining surface on one of the collars.

Both side faces of the tire may have frusto-conical surfaces which match with frusto-conical retaining surfaces on two retaining collars on the shaft. The frusto-conical surfaces lie on two cones each having a cone angle which is such that differential thermal expansion between the tire and the retaining collars results only in relative sliding movement.

The angle of each cone is such that the tangent of half the cone angle is equal to the radial distance of any point on said frusto-conical surfaces from the axis of the roll, divided by the axial distance of that point from a radial neutral plane at which two cone apices meet. Preferably the two cones have the same angle so that the radial neutral plane bisects the tire.

Preferably the retaining collars are made of the same material as the shaft.

One collar may be made in two semi-circular halves which are clamped together on to the shaft, and the second collar is clamped to the first collar.

In other embodiments the collars are formed with bosses having end faces which abut beneath the tire. The collars are held on the shaft by wedge-shaped keys located in an axially-extending keyway in the shaft surface and driven home beneath the collars. The end faces of the collars may be formed with complementary recesses which define holes spaced around the roll to accommodate securing pins which extend into radially aligned holes in the shaft.

The assembly of the collars and the tire may be located on the shaft by circlips which engage in circumferential grooves in the shaft surface.

The assembly of the collars and the tire may be secured to the shaft by securing the other collar to the shaft by at least one securing pin which extends radially of the roll through a hole in the collar into an aligned hole in the shaft.

The two collars may be symmetrical with inwardly-directed bosses having inclined faces which bear on complementary inclined faces of a central wedge ring who is of triangular cross-section. Clamping bolts pass through the collars and the wedge ring and when tightened force the wedge ring against the shaft to secure the collars and the tire to the shaft.

One collar may have an inwardly-directed boss having an inclined face which bears on a complementary inclined face of a wedge ring located beneath the tire. The wedge ring has a flat annular face which abuts against a flat annular end face of an inwardly-directed boss of the other collar, and the collars are clamped together by bolts which pass through the collars and the wedge ring and force the wedge ring against the shaft.

One collar may have an externally threaded boss which extends beneath and beyond the tire, and the other collar has an internal thread which tightens on to the threaded boss to clamp the boss to the shaft.

the invention also comprehends a conveyor roll in which a plurality of said tires are each held between retaining collars in any one of the ways set out above and are spaced apart along the length of the shaft.

BRIEF DESCRIPTION OF THE DRAWINGS

Some embodiments of the invention are described in detail below, by way of example, with reference to accompanying drawings, in which.

DESCRIPTION OF THE PREFERRED EMBODIMENTS

Figure 1:
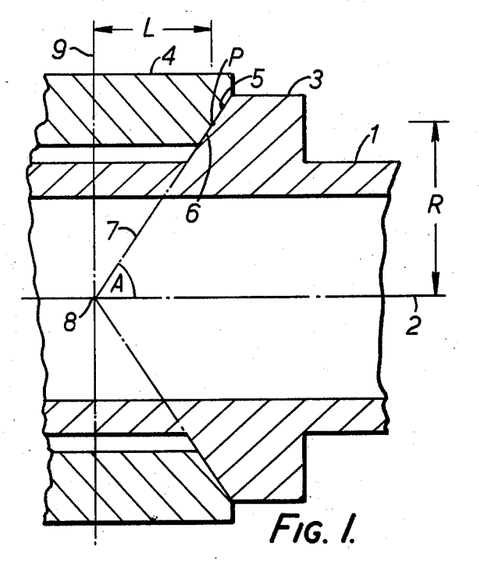
FIG. 1 illustrates schematically the principle of the invention whereby differential thermal expansion between a tire and a retaining member is accommodated.

Referring to the drawings FIG. 1 illustrates schematically part of a conveyor roll according to the invention which roll comprises a cylindrical shaft 1 which rotates about an axis 2. The shaft has an integral projecting annular collar 3 which serves as a retaining member which is one member for retaining an annular tire 4 on the shaft. The tire projects from the shaft surface and is made of a material different from the material of the shaft 1 and the retaining member 3. The tire 4 has a frusto-conical surface 5 which engages against a matching frusto-conical surface 6 of the retaining member 3.

The frusto-conical surfaces 5 and 6 lie on the surface of the same cone indicated by the dotted lines 7, whose apex is located in a fixed neutral plane 9 which is a radial plane of the shaft and is thereby perpendicular to the axis of rotation 2 of the shaft.

This plane 9, for the purpose of this explanation, passes through the tire 4 on a plane were there is no differential longitudinal movement parallel to the axis 2 between the tire and the shaft as the roll is heated.

The design of the retaining member 3 and the tire 4 is such that the angle of the cone 7 on which the matching frusto-conical surfaces 5 and 6 lie is such that differential thermal expansion between the tire and the retaining member 3 causes sliding movement only of the frusto-conical surfaces 5 and 6 relative to each other. This condition is achieved when the tangent of the angle A, that is half the cone angle, is equal to the radial distance R of any point P on the frusto-conical surfaces 5 and 6 from the axis 2 of the roll, divided by the axial distance L of that point P from the radial plane 9.

That is, in the schematic illustration of FIG. 1, the conditions of the invention are satisfied when:

tan $A = R/L$

When the matching frusto-conical surfaces 5 and 6 satisfy this condition, every point P on those surfaces 5 and 6 will move in the same direction that is on the surface of the cone 7 when there is any differential thermal expansion between the tire and the retaining member 3, regardless of the size of the temperature change and of the difference between the coefficients of thermal expansion of the materials of the shaft and retaining member and the tire.

The frusto-conical surfaces 5 and 6 are therefore maintained in engagement without any change in the pressure applied between those surfaces and hence without imposing any change of strain on the tire or the retaining member, assuming negligible friction.

Figure 2:
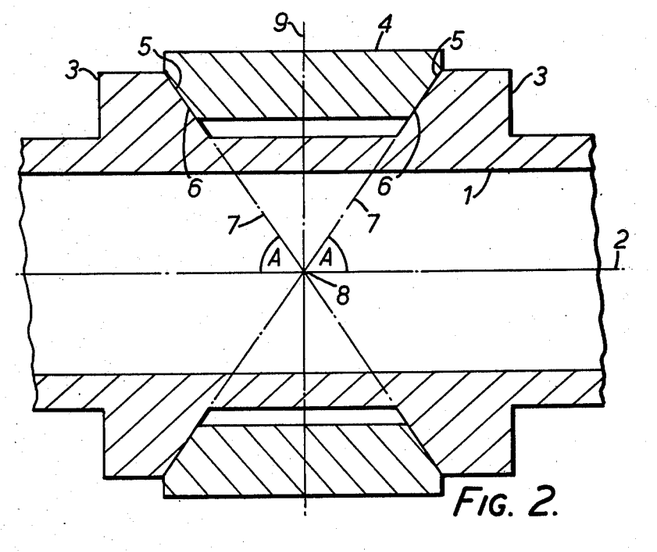
FIG. 2 is a schematic diagram similar to FIG. 1 illustrating the principle of the invention as applied to a tire held between two retaining members integral with the shaft of a roll.

A preferred form of the invention is illustrated schematically in FIG. 2. Both side faces of the tire 4 have frusto-conical surfaces 5 which match frusto-conical retaining surfaces 6 on retaining members 3 in the form of collars of annular shape integral with and projecting from the shaft 1. The neutral plane 9 bisects the tire 4 and the apices of the two cones 7 meet at the point 8 which lies where the axis of rotation 2 intersects the plane 9. When the temperature rises expansion occurs symmetrically on either side of the plane 9 and the frusto-conical faces 5 of the tire are maintained in engagement with the frusto-conical faces of the retaining members 3 and any differential expansion is accommodated by sliding movement of those surfaces in the direction of the surfaces of the cones 7. The clamping pressure exerted on the tire 4 does not change as the temperature rises.

This enables tire of a rigid material having a different coefficient of thermal expansion from that of the material of the shaft 1 and the retaining members 3 to be employed. The conveyor roll can be assembled at normal room temperature without any need for subsequent adjustment as the roll is heated up for use under high temperature conditions. The same conveyor roll can be used at different temperatures and in principle at any temperature within the range of suitability of the materials employed.

Figure 3:
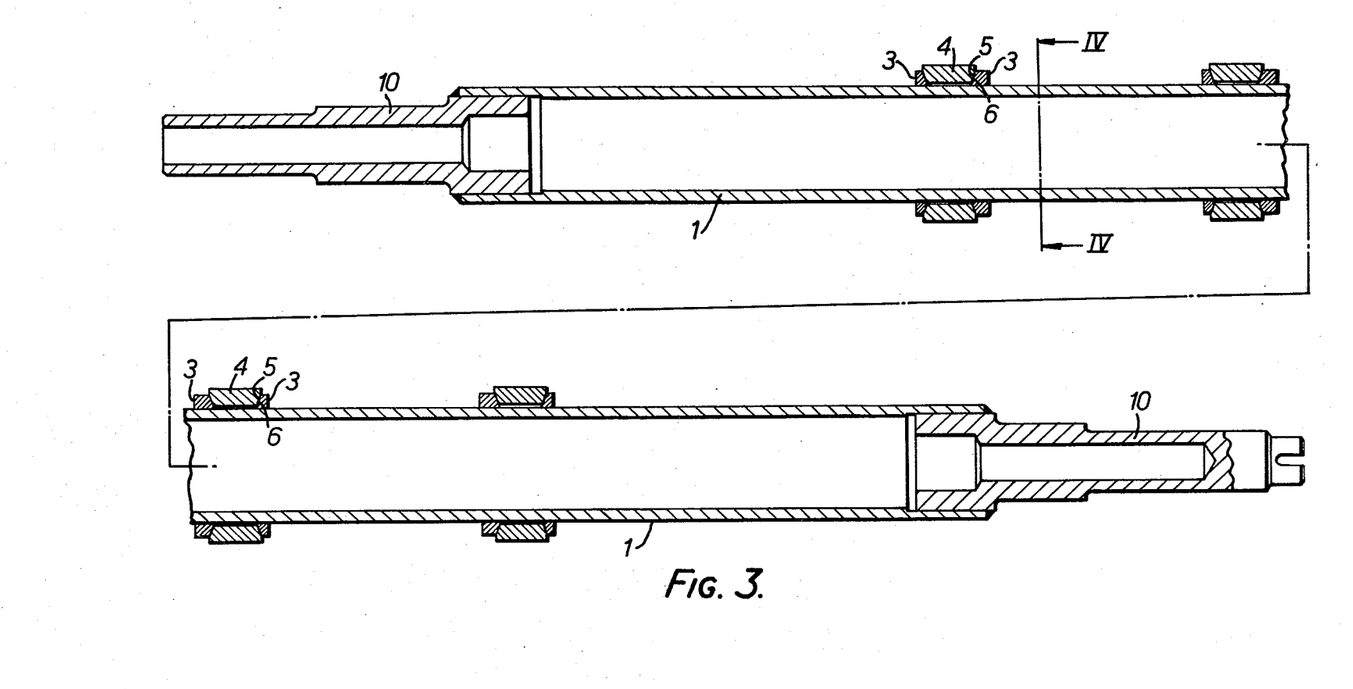
FIG. 3 is a vertical section through a conveyor roll according to the invention showing diagrammatically a plurality of projecting annular tires held between retaining collars on the shaft of the roll and spaced apart along the length of the roll.

In practice the retaining members may not be made integrally with the shaft but may comprise separate parts mounted on a simple cylindrical shaft. FIG. 3 illustrates a conveyor roll comprising a central cylindrical mild steel shaft 1 which is shrunk on to, and welded to end trunnions 10. A number of projecting annular tires 4 of a solid rigid material are spaced along the length of the shaft 10. There may for example be eight such tires. Each tire is held between retaining members 3 which are in the form of retaining collars of the same mild steel as the shaft 1, therefore having the same coefficient of thermal expansion as the shaft and at least one of which is secured to the shaft. Both side faces of each tire have frusto-conical surfaces 5 which match with frusto-conical retaining surfaces 6 on the two retaining collars 3.

Figure 4:
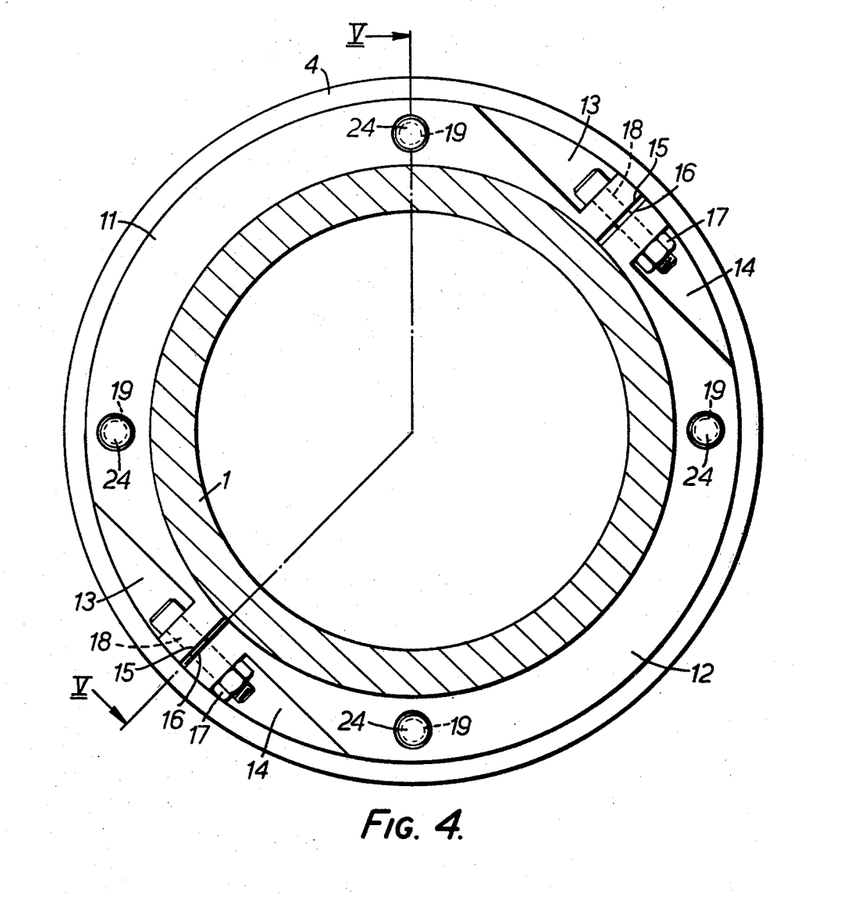
FIG. 4 is a section on line IV—IV of FIG. 3.
Figure 5:
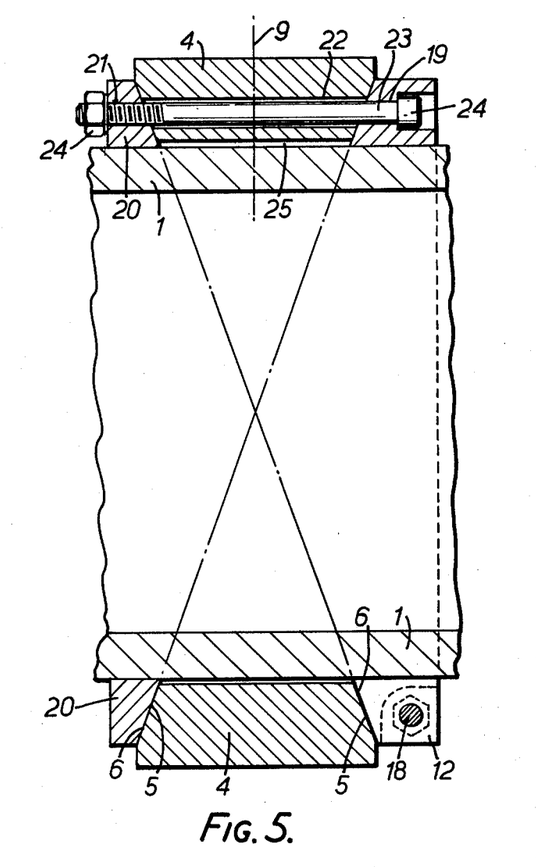
FIG. 5 is a section on line V—V of FIG. 4.

FIGS. 4 and 5 illustrate in greater detail one way of holding a tire 4 between retaining collars one of which is clamped to the shaft 1. One of the collars 3 is made into semi-circular halves 11 and 12 whose internal diameter is the same as the external diameter of the shaft. Each end of each of the semi-circular halves is formed with recesses respectively 13 and 14 and the halves of the retaining collar have end faces 15 and 16 which abut or nearly abut when the two halves 11 and 12 of the retaining collar are clamped together on the shaft 1 by the tightening of nuts 17 on bolts 18 which pass through apertures in the end flanges of the halves of the retaining collar which are formed by the recesses 13 and 14. The inner face 6 of both of the semi-circular halves of the retaining collar lie on the surface of a cone 7 whose apex lies in the neutral plane 9 which bisects the tire 4 as described above with reference to FIGS. 1 and 2. Each of the semi-circular halves 11 and 12 has two holes 19 formed axially of the roll and these holes, which are for clamping a second retaining collar to the fixed collar are positioned so that when the two semi-circular halves 11 and 12 of the retaining collar are clamped onto the shaft 1, the holes 19 are equally spaced around the shaft.

When the retaining collar formed by the two semi-circular halves 11 and 12 has been securely clamped into position on the shaft 1 and the tire 4 is slid along the shaft followed by a second collar which is an annular collar 20 having an inner face 6 of frusto-conical form matching the frusto-conical side face 5 of the tire 4. The collar 20 has four holes 21 which are aligned with the holes 19. The tire 4 also has four holes 22 which are aligned with the holes 19 and 21 and clamping bolts 23 whose heads 24 are countersunk into the semi-circular halves 11 and 12 are passed through the holes 19, 22 and 21 and are held by nuts 24 which are tightened against the outer face of the collar 20. The holes 22 in the tire 4 are large enough to provide a clearance around the bolts 23 and the internal diameter of the tire 4 is greater than the external diameter of the shaft 1 to provide a clearance indicated at 25. These clearances accommodate differential thermal expansion as between the tire 4 the shaft 1 and the retaining collars 20 and 11, 12. The bolts 23 and nuts 24 are made of the same material as the shaft 1 and the collars 20 and 11, 12, or from a material having the same coefficient of thermal expansion as those members.

The tire 4 is thus held between the clamped collar 11, 12 and the second collar 20 which is clamped to the first collar 11, 12 through the holes 22 in the tire 4.

Figure 6:
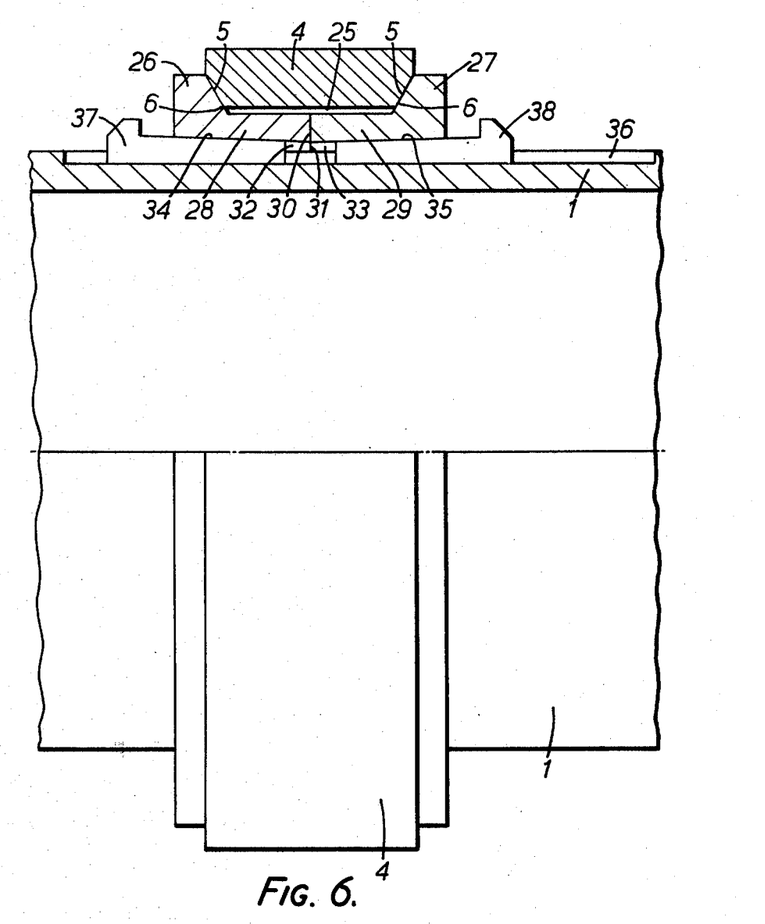
FIG. 6 is a view partly in section illustrating another way of securing a tire to the shaft of a conveyor roll.

FIG. 6 illustrates another way of securing the assembly of the tire 4 and its retaining collars to the shaft 1. Two collars 26 and 27 between which the tire 4 is held are both of annular form. The collar 26 has a boss 28 which extends beneath the tire 4. The collar 27 has a similar boss 29 which extends beneath the tire 4 and the bosses 28 and 29 have accurately machined abutting faces 30 and 31 which abut centrally beneath the tire. Each of the collars has an inner frusto-conical surface 6 which surfaces match the frusto-conical side faces of the tire 4. There is a clearance 25 between the bottom of the tire and the abutting bosses 28 and 29. The lower face of each of the collars 26 and 27 is formed with a groove, respectively 32 and 33 which grooves have faces 34 and 35 which are inclined downwards towards the centre of the assembly. When the assembly of the two collars and the tire 4 has been slid into position along the shaft 1 the grooves 32 and 33, which are aligned, are oriented over an axially-extending keyway 36 which is cut into the surface of the shaft. Wedge-shaped keys 37 and 38 are driven home along the keyway 36 into the grooves 32 and 33, the keys 37 and 38 having inclined faces which match the inclined faces 34 and 35 of the grooves 32 and 33. When the keys 37 and 38 are driven home beneath the collars they maintain the end faces 30 and 31 of the bosses 28 and 29 in abutment and lock the collars 26 and 27 to the shaft 1. The abutment of the two surfaces 30 and 31 effectively determines the clamping pressure applied by the collars 26 and 27 to the tire 4.

Figure 7:
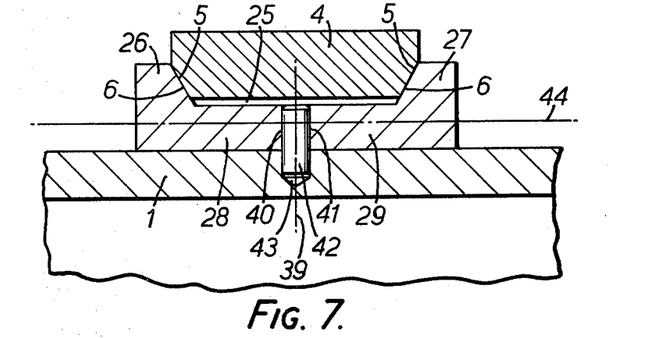
FIG. 7 is a sectional view similar to part of FIG. 6 illustrating another embodiment of the invention.

In the embodiment illustrated in FIG. 7 the tire 4 is held between two annular collars 26 and 27 similar to those illustrated in FIG. 6 except that the shaft-engaging surfaces of the collars 26 and 27 are cylindrical. The line of abutment of the two end faces of the bosses 28 and 29 is indicated at 39. The end faces of the bosses are formed with complementary recesses 40 and 41 of semi-cylindrical form which together define holes spaced around the roll to accommodate securing pins 42 which extend through those holes defined by the recesses 40 and 41 into radially aligned holes 43 formed in the shaft 1. The collars 26 ad 27 have aligned holes passing right through the collars and the bosses on a centre line as indicated at 44 but which holes are angularly spaced around the roll from the securing pins 42. Bolts extend on a centre line 50 through these holes right through both collars 26 and 27 with the bolt head against the outer face of one collar and a nut tightened on to the end of the bolt against the other collar to clamp the two collars together. The "hidden pin" arrangement of FIG. 7 is assembled by sliding one collar 26 on to the shaft 1, inserting the pins 42, sliding the tire 4 on to the shaft and over the collar 26, then sliding the other collar 27 into registry with the pins 42 and then securing the two collars together by means of one or more bolts passing through aligned holes in the collars 26 and 27.

In the three embodiments of FIG. 8, FIG. 9 and FIGS. 10 to 12 the two retaining collars are of similar form. One collar 45 is an annular collar having the inner frusto-conical surface 6 and a flat abutment face 46 which extends inwardly from the inner end of the frusto-conical surface 6. The other collar 47 has a boss 48 which extends beneath the whole of the tire and has a flat end face 49 which abuts against the end face 46 on the collar 45 when the two collars are clamped together by means of bolts, not shown, but for example passing through holes in the collars having a centre line 50. There are a number of such bolts around the collars which hold the accurately machined faces 49 and 46 in abutment thereby determining the clamping pressure holding the tire 4 between the collars 45 and 47.

Figure 8:
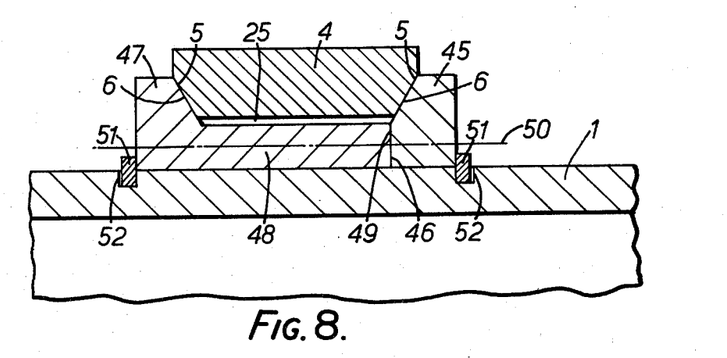
FIGS. 8 and 9 are sectional views similar to part of FIG. 6 illustrating two more embodiments of the invention.
Figure 9:
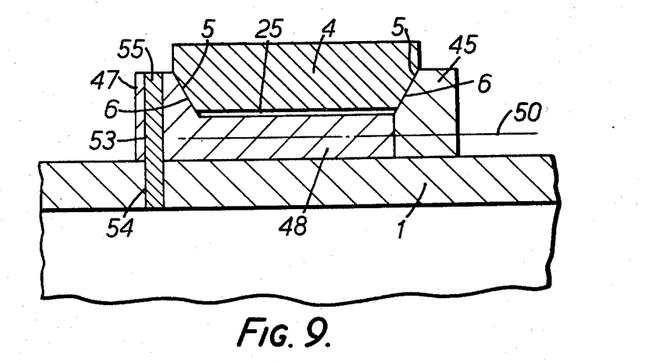

In the FIG. 8 embodiment the assembly of the collars and the tire which may be put together away from the shaft 1 and then slid along the shaft, is located on the shaft by means of circlips 51 made of the same material as the shaft 1 and the collars 45 and 47, and which engage, with a side clearance to permit expansion, in circumferential grooves 52 in the shaft surface. In FIG. 9 the collars 45 and 47 have the same form as in FIG. 8 and are clamped together by bolts to form an assembly. The collar 47 has a number of radial holes 53 spaced around the collar and when in position on the shaft the holes 53 are located in register with holes 54 in the shaft. Securing pins 55 are inserted into the aligned holes 53 and 54 and the pins 55 which extend radially of the roll secure the collar 47 to the shaft 1 thereby securing the assembly of collars and tire to the shaft.

Figure 10:
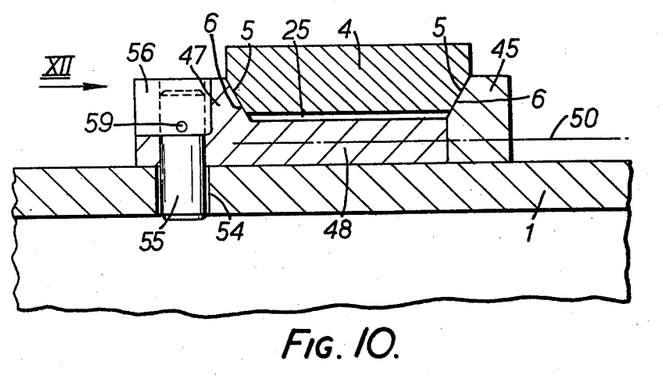
FIG. 10 is a sectional view similar to part of FIG. 6, illustrating yet another embodiment of the invention.
Figure 11:
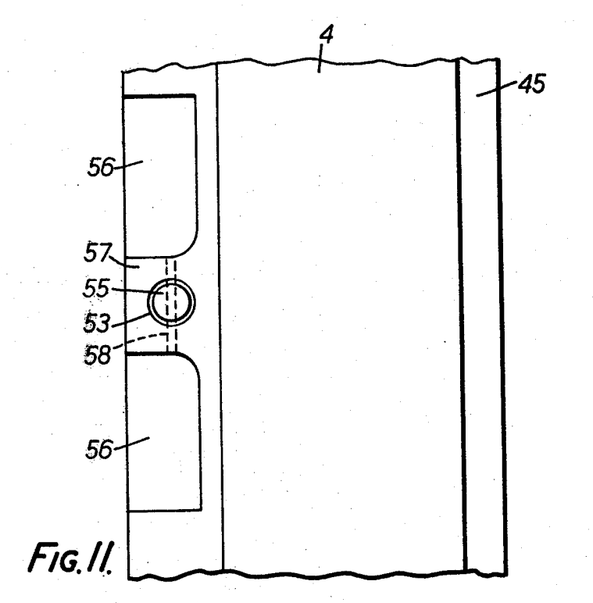
FIG. 11 is part of a top plan view of the embodiment of FIG. 10.
Figure 12:
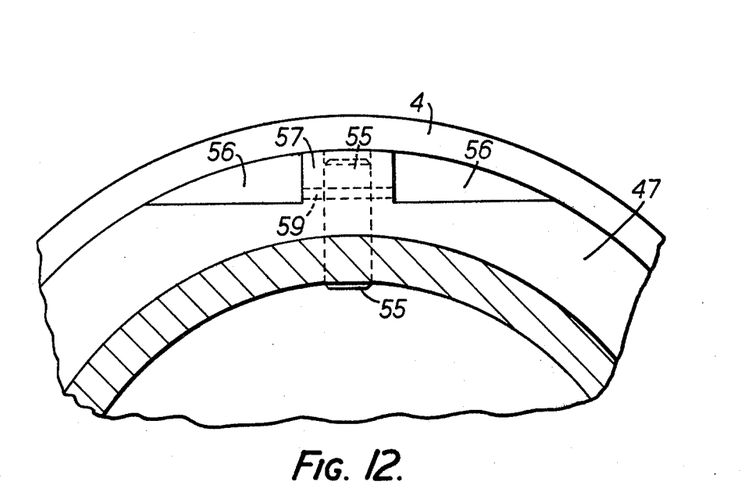
FIG. 12 is a side view of the embodiment of FIG. 10 in the direction of arrow XII on FIG. 10.

FIGS. 10 to 12 illustrate a modification of the embodiment of FIG. 9. The collar 47 is wider than the collar construction of FIG. 9 and is formed with recesses 56 on either side of the hole 53 which hole thereby extends through a projection 57 between the recesses 56. A transverse hole 58 is formed through the projection 57 and the securing pin 55, and a removable locking pin 59 extends through the transverse hole 58 between the recesses to lock the securing pin in its radial position extending through the hole 53 into the hole 54 in the shaft 1. The provision of the recesses 56 permits the locking pin 59 to be inserted and withdrawn easily.

Figure 13:
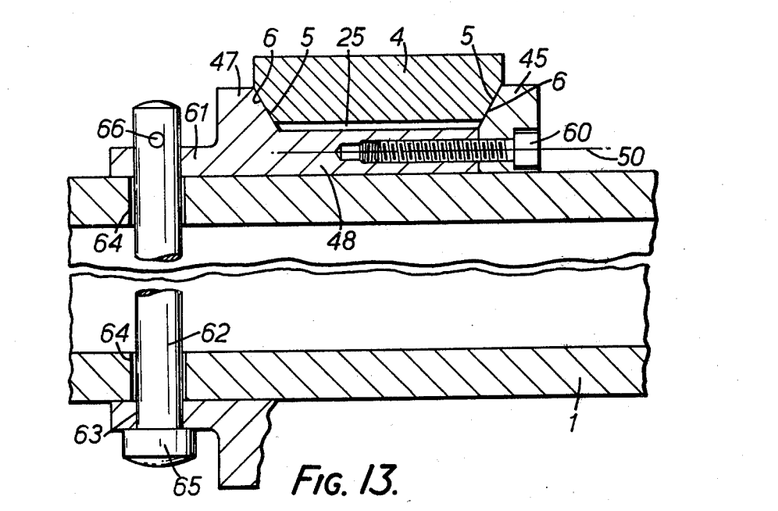
FIG. 13 illustrates an axial section through another embodiment of the invention.

FIG. 13 illustrates yet another embodiment of the invention in which the retaining collars are an annular collar 45 and collar 47 with a boss 48 extending beneath the tire of the kind previously described with reference to FIG. 8. One of the securing bolts 60 is shown. This bolt is on the centre line 50 and a plurality of such bolts clamp the collars 45 and 47 together with the tire 4 held between the frusto-conical surfaces 6 of those collars.

The collar 47 has an outwardly extending boss 61 and a long securing pin 62 extends through, and is held in diametrically opposed holes 63 in the boss 61 and diametrically opposed holes 64 in the shaft 1 to secure the assembly of the collars 45 and 47 and the tire 4 to the shaft. The holes 64 have an expansion clearance around the pin 62 which has a head 65 at one end and is secured at the other end by a transverse locking pin 66 inserted into a transverse hole through the pin 62. In this embodiment the collars 45 and 47 and the tire 4 are pre-assembled and clamped together by means of the bolts and the assembly is then slid into position along the shaft 1 and secured by the securing pin 62.

Figure 14:
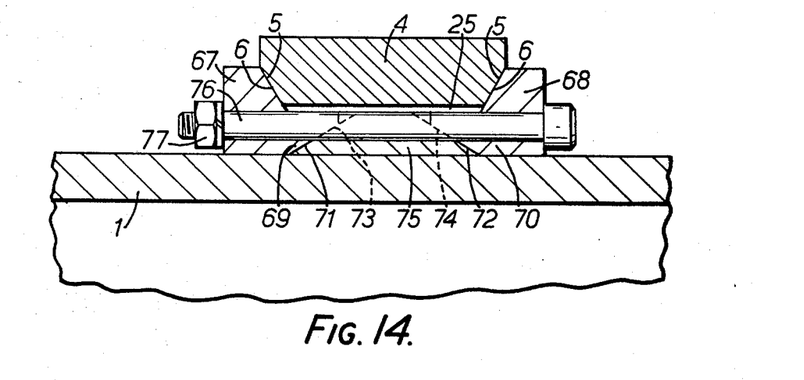
FIGS. 14, 15 and 16 are sectional views similar to part of FIG. 6 of three further embodiments of the invention.

Another embodiment is illustrated in FIG. 14. Two symmetrical retaining collars 67 and 68 are employed having frusto-conical surfaces 6 for engaging the frusto-conical surfaces 5 on the tire. The collars 67 and 68 have inwardly directed bosses 69 and 70 which have inclined faces 71 and 72 which bear inwardly on to complementary inclined faces 73 and 74 of a central wedge ring 75 whose cross-section is of triangular form but truncated so as to retain the clearance 25 inside the tire 4. The collars 67 and 68 are clamped together by bolts 76 which pass through holes in the collars and in the wedge ring 75. When the nuts 77 on the ends of the bolts 76 are tightened the action of the inclined faces 71 and 72 of the bosses of the collars on the wedge ring force the wedge ring against the shaft to secure to the shaft the collars and the tire which they hold. The matching inclined faces on the bosses 69 and 70 and the wedge ring 75 are such that when the wedge ring is clamped tightly against the shaft 1 the required clamping pressure is applied to the tire 4 by the surfaces 6 of the retaining collars 67 and 68.

Figure 15:
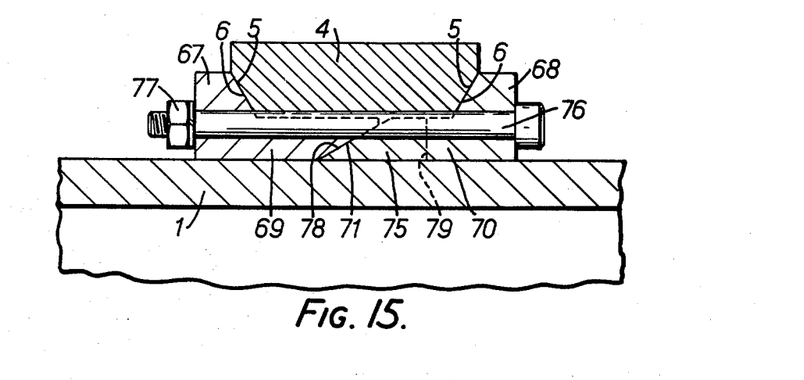

FIG. 15 illustrates a variant of the embodiment of FIG. 14. The collar 67 has a longer boss 69 extending some way beneath the tire 4. This inwardly directed boss 69 has an inclined face 78 which bears on a complementary inclined face 71 of the wedge ring 75 which in this embodiment has a flat annular face 79 which abuts against a flat annular end face of the inwardly directed boss 70 of the collar 68. When the collars 67 and 68 are clamped together by tightening of the nuts 77 on the bolts 76 which pass through both collars and through the wedge ring 75, the wedge ring 75 is forced against the shaft by the inclined surface 78 on the boss 69 to secure to the shaft the collars 67 and 68 and tire 4. Again the complementary inclined surfaces 71 ad 78 are designed so that when the wedge ring 75 is clamped against the shaft 1 the required holding pressure is applied to the tire 4 by the surfaces 6 of the collars 67 and 68. The wedge ring 75 may be split to facilitate contraction of the wedge ring as it is clamped on to the shaft.

Figure 16:
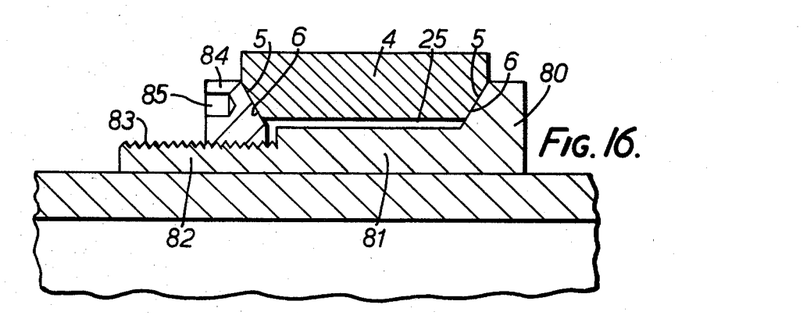

FIG. 16 illustrates another embodiment in which one collar 80 has a boss 81 which extends beneath and beyond the tire. The part 82 of the boss extending beyond the tire has an external thread 83. The other collar 84 has an internal thread which tightens on to the threaded boss 82, which may be split to facilitate contraction, to clamp the boss 82 to the shaft 1 when the frusto-conical surface 6 of the collar 84 is in holding engagement with the matching frusto-conical surface 5 of the tire 4. The collars 80 and 84 are made of the same material as the shaft. This embodiment is pre-assembled by pre-assembling the collars 80 and 84 and the tire 4 with the collar 84 only lightly screwed on to the boss 82. The pre-assembled unit is slid on to and along the shaft to the required position and then the collar 84 is tightened on to the boss 82 to clamp the tire between the collars and to force the extension 82 of the boss against the shaft thereby clamping the assembly to the shaft. Holes 85 in the collar 84 are for the insertion of a tool to facilitate the tightening of the collar 84 on to the boss 82.

In each of the embodiments described above the retaining collars and tire have matching frusto-conical surfaces which lie on cones as described with reference to FIG. 2 so that the clamping pressure on the tire 4 is not affected by differential thermal expansion as between the tire 4 and the collars and shaft.

The collars, clamping bolts, keys, securing pins and wedge rings in the embodiments described are preferably made from the same material as the shaft or are made from a material having the same coefficient of thermal expansion as the shaft. The material usually used is steel. The tires 4 can be made of a material which is particularly suited to the use and temperature of use of the conveyor roll, for example is suitable for supporting a ribbon of hot glass which is being conveyed through a flat glass annealing lehr. The material of the tires 4, for example fused silica or bonded ceramic fibre, can have a different coefficient of thermal expansion from that of the material of the shaft, and clamping parts.

The conveyor roll can be assembled in the workshop at normal room temperature and can then be heated to a required operating temperature without any need for further adjustment of the tires and their holding members. The possible range of operating temperatures is not limited by problems of differential expansion such as have been encountered hitherto because the only movement between parts which takes place when the conveyor roll is heated to operating temperaure is the sliding movement of the frusto-conical surfaces 5 and 6 relative to each other so that, frictional forces being ignored, the clamping pressure exerted on the tire 4 by its retaining collars is not affected by such differential expansion.

Figure 17:
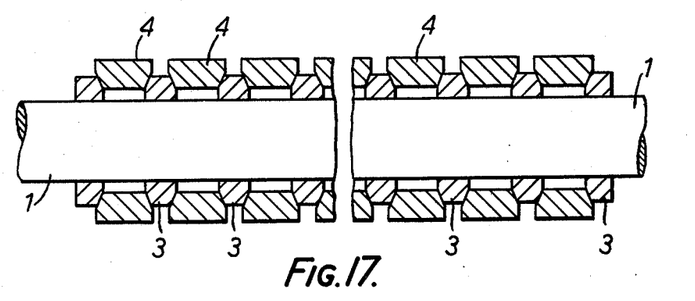
FIGS. 17 and 18 are schematic representations partly in section of two further embodiments of the invention.

A roll in accordance with the invention may comprise a plurality of tires and retaining members disposed in closely spaced relationship such that the tires together provide almost a complete cylindrical surface extending virtually the full length, or a substantial proportion of the length, of the roll. Such an arrangement is schematically illustrated in FIG. 17 which shows a series of tires 4 held between retaining members 3 secured to the shaft 1. The small gaps between the tires are sufficient to accommodate the maximum thermal expansion which will occur in use.

Figure 18:
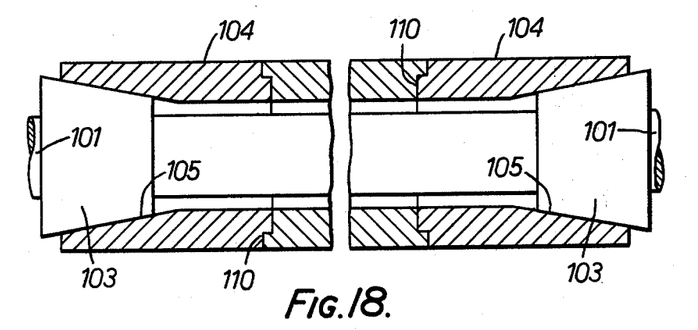

Alternatively, a roll in accordance with the invention may comprise a wide tire providing a complete cylindrical surface in the form of a sleeve extending virtually the full length, or a substantial proportion of the length, of the roll, and such tire may if desired be composed of a plurality of contiguous tire portions disposed along the length of the roll. Such an arrangement is schematically illustrated in FIG. 18 which shows a roll comprising a shaft 101 having towards its ends frusto-conical members 103 secured, e.g. pinned, to the shaft 101. The tire is composed of a plurality of tire portions 104 with spigot connectors 110, the composite tire extending between the end members 103. The two end tire portions 104 have frusto-conical surfaces 105 which match and engage against the frusto-conical surfaces of the end members 103, the cone angle being as previously described such that differential expansion produces only sliding movement between the surfaces. With an arrangement of this form the cone angle could become sufficiently acute for frictional forces to be significant, and therefore, to prevent jamming of the parts by friction, the tangent of the half-one angle should be greater than the coefficient of friction between the engaging frusto-conical surfaces.

The invention is primarily described above in terms of a roll which is used under high temperature conditions which are higher than those under which it is assembled, but can also find application in a roll which is used under low temperature conditions which are lower than those under which it is assembled. Thus a roll in accordance with the invention can be made of materials chosen for low or high temperature application, and the tire material can be suitable for contacting, and especially conveying, a particular material, such as glass, without adversely affecting, for example marking, the material during transport or other contact.

We claim:

1. A roll for use under high or low temperature conditions, comprising at least one tire member having a frusto-conical surface, and a retaining member of a different material from the tire member and having a matching frusto-conical surface which is engaged by the frusto-conical surface of the tire member, the angle of the cone on which said matching frusto-conical surfaces lie being such that differential thermal expansion between the tire member and the retaining member causes sliding movement only of the frusto-conical surfaces relative to each other witout substantially affecting the pressure therebetween.

2. A roll for use under high or low temperature conditions, comprising a shaft, an annular tire, and two retaining collars on the shaft between which collars the tire is held, at least one of which retaining collars being secured to the shaft, and which collars are of different material from the tire, wherein at least one side face of the tire and a retaining surface on one of said collars have matching frusto-conical surfaces which lie on a cone whose angle is such that differential thermal expansion between the tire and the retaining collars causes sliding movement only of said matching frusto-conical surfaces relative to each other without substantially affecting the pressure therebetween.

3. A roll for use under high or low temperature conditions, comprising a shaft, an annular tire both side faces of which are formed as frusto-conical surfaces, and two retaining collars between which the tire is held, which collars are of a different material from the tire and are formed with frusto-conical retaining surfaces which match with and engage against said frusto-conical surfaces of the side faces of the tire, and wherein said matching frusto-conical surfaces lie on two cones each having a cone angle which is such that differential thermal expansion between the tire and the retaining collars results only in sliding movement between the frusto-conical surfaces of the tire and the frusto-conical surfaces of the retaining collars without substantially affecting the pressure therebetween.

* * * * *